United States Patent [19]
Hurite

[11] Patent Number: 5,702,157
[45] Date of Patent: Dec. 30, 1997

[54] ADJUSTABLE ARMREST MECHANISM

[75] Inventor: John M. Hurite, West Bloomfield, Mich.

[73] Assignee: Tachi-S Engineering, U.S.A., Inc., Farmington Hills, Mich.

[21] Appl. No.: 704,215

[22] Filed: Aug. 23, 1996

[51] Int. Cl.⁶ ........................................ A47C 7/54
[52] U.S. Cl. ........................ 297/411.38; 297/411.32
[58] Field of Search ................... 297/411.38, 411.32, 297/408, 113, 115

[56] References Cited

U.S. PATENT DOCUMENTS

| | | |
|---|---|---|
| 4,230,414 | 10/1980 | Cheshire . |
| 4,496,190 | 1/1985 | Barley . |
| 4,621,864 | 11/1986 | Hill . |
| 4,655,501 | 4/1987 | Ishigami et al. . |
| 4,674,790 | 6/1987 | Johnson . |
| 4,807,935 | 2/1989 | King . |
| 4,828,323 | 5/1989 | Brodersen et al. . |
| 4,946,226 | 8/1990 | Hurn et al. . |
| 4,978,171 | 12/1990 | Tateyama . |
| 4,984,847 | 1/1991 | Bedu et al. . |
| 5,042,877 | 8/1991 | Yokota . |
| 5,076,645 | 12/1991 | Yokota . |
| 5,106,160 | 4/1992 | Nomura et al. . |
| 5,246,267 | 9/1993 | Nagashima et al. . |
| 5,342,115 | 8/1994 | De Filippo . |
| 5,409,297 | 4/1995 | De Filippo . |
| 5,433,509 | 7/1995 | Hotary et al. . |
| 5,489,143 | 2/1996 | Adachi et al. . |
| 5,597,209 | 1/1997 | Bart et al. ............ 297/411.38 |

FOREIGN PATENT DOCUMENTS

| | | | |
|---|---|---|---|
| 3344707 | 6/1985 | Germany | 297/411.32 |
| 6141949 | 5/1994 | Japan | 297/411.38 |

*Primary Examiner*—Laurie K. Cranmer
*Attorney, Agent, or Firm*—Dykema Gossett PLLC

[57] ABSTRACT

An adjustable armrest mechanism includes a mounting bracket securely mounted relative to a vehicle seatback, an armrest rotatable relative to the mounting bracket, an armrest bracket securably attachable to the armrest, a pawl attachable with the armrest bracket, a coil spring for biasing the pawl, and a ratchet securably mounted onto the mounting bracket. The ratchet includes a camming surface having a plurality of serrated teeth for engagement with the pawl. A plurality of in-use positions are defined by engagement between the pawl and the serrated teeth. The armrest bracket includes a stop which prevents further rotation of the pawl member during disengagement. Cooperative engagement of the pawl with an armrest stop and a ratchet stop on the camming surface prevents further rotation of the pawl during relative rotation into the non-use position.

1 Claim, 4 Drawing Sheets

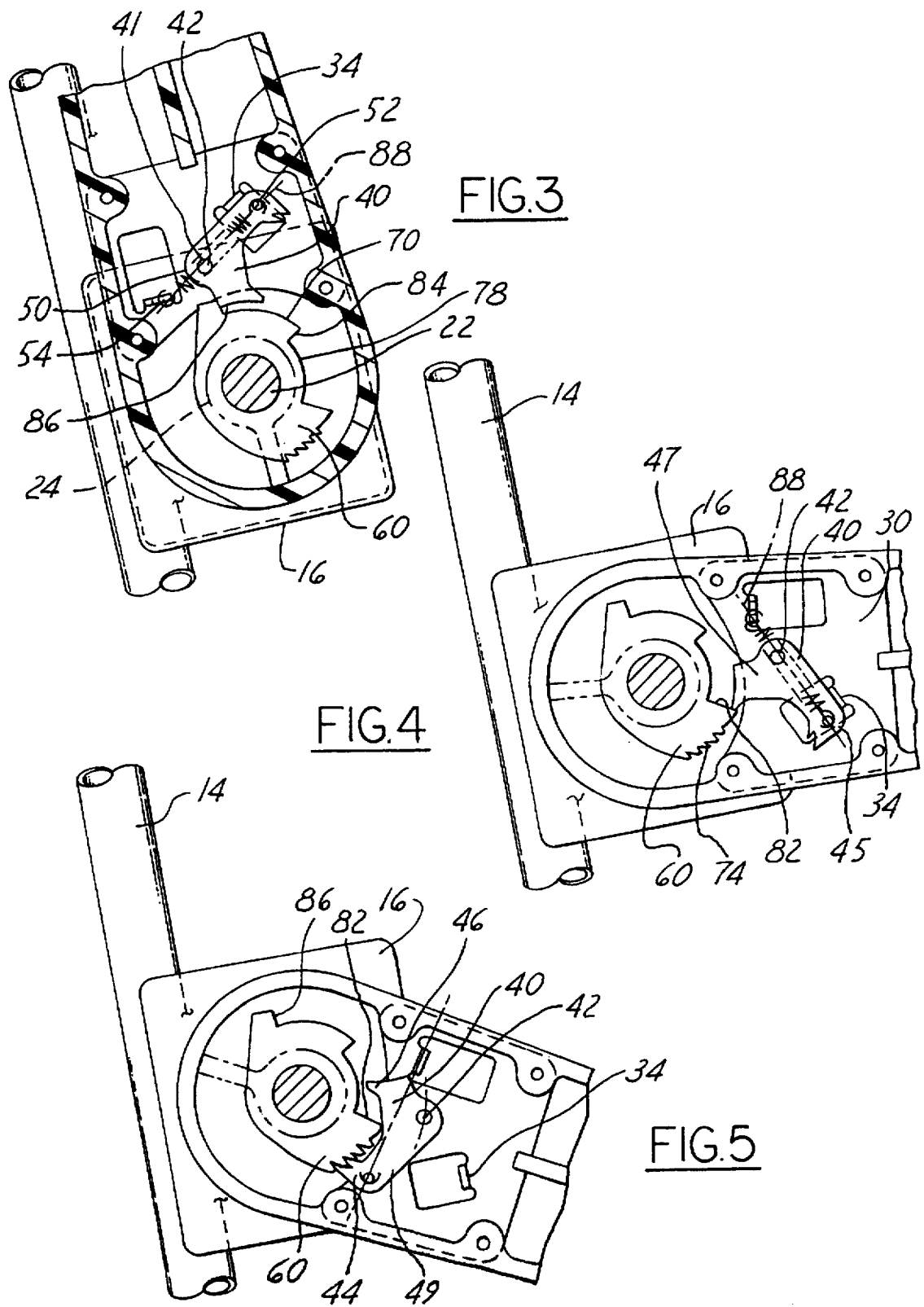

5,702,157

ADJUSTABLE ARMREST MECHANISM

FIELD OF USE

The present invention relates to an adjustable armrest mechanism for use relative to a vehicle seat, and in particular, to a rotatable armrest that rotates between multiple in-use positions to a non-use position when positioned upright along the side of the seatback.

BACKGROUND OF THE INVENTION

Typically, the armrest is flush with the seatback when in the non-use position, and is horizontal when in the in-use position and the seatback is upright. Most seatbacks include various reclining positions in addition to the generally upright position. When the seatback is reclined, the armrest must be adjustable for engagement into various in-use positions so that the arm of the person using the seat is adequately supported.

While there are other armrests that enable such adjustment, there is a need for an armrest mechanism that is robust and reliable, that is capable of providing trouble-free operation when rough usage is likely.

What is needed is an armrest mechanism that is inexpensive to make, easy to install, and convenient to use, that is easily adjustable in a quick and precise manner without distraction, and has a degree of flexibility for modern multi-purpose vehicles.

SUMMARY OF THE INVENTION

The adjustable armrest mechanism of the present invention comprises a mounting bracket, an armrest member having an armrest bracket, a pawl and spring member, and a ratchet having a camming surface. The mechanism includes a variety of in-use positions for the comfort of the driver or the passenger.

The mounting bracket is secured to the vehicle seatback. The armrest member is pivotably secured to the mounting bracket, and the armrest bracket is fixed to the armrest member.

The pawl is rotatably attached to the armrest bracket. The pawl has a first projection positionable at a first end thereof and a second projection positionable at a second end thereof. The pawl is biased by a spring member toward the ratchet in any of a plurality of in-use positions of the armrest, and is biased by the spring member away from the ratchet in the non-use position of the armrest.

The ratchet is secured to the mounting bracket, and includes a camming surface specifically designed for cooperative engagement, disengagement, and re-engagement with the pawl. The camming surface includes a plurality of serrated teeth, a disengagement projection, a recessed portion, a shoulder, and a stop.

For a more complete understanding of the adjustable armrest mechanism of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 3 is a partial sectional view of the adjustable armrest mechanism of FIG. 1 in the non-use position.

FIG. 4 is a partial sectional view of the adjustable armrest mechanism of FIG. 1, with the arm rest moved from the non-use position toward the in-use position and with a re-engagement projection of the pawl engaged by a pawl projection.

FIG. 5 is a partial sectional view of the adjustable armrest mechanism of FIG. 1 in the initial in-use position.

DETAILED DESCRIPTION OF THE INVENTION

Figure 1:
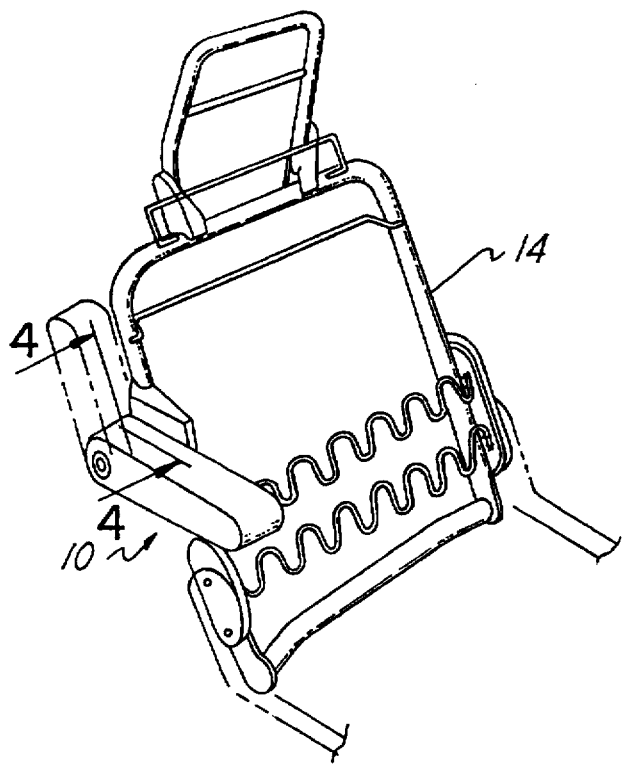
FIG. 1 is an environmental perspective of the preferred embodiment of the adjustable armrest mechanism of the present invention relative to a seat of a vehicle in the one of the in-use positions, with the non-use position shown in phantom.

Referring now to the drawings, a first preferred embodiment of the adjustable armrest mechanism 10 of the present invention, is shown in FIGS. 1 through 6. The mechanism 10 comprises a mounting bracket 16, an armrest member 20, an armrest bracket 30, a pawl 40 with a tension spring member 50, and a ratchet 60.

The armrest member 20 is selectively pivotable between a non-use position and a plurality of in-use positions. Other elements of armrest mechanism 10 have corresponding non-use and in-use positions. While the armrest mechanisms illustrated are for use on the right-hand side of a seat, a mirror-image mechanism can be used on a left-hand side of a seat.

The armrest member 20 shown is made from a hard plastic material that is ribbed and hollow, and is flush with the vehicle seatback 14 when in the non-use position, and is in a generally horizontal position when in the selected in-use position and the seatback 14 is upright.

To engage the armrest mechanism 10, the armrest member 20 is rotated downward until locked engagement is achieved. The armrest member 20 may then be rotated upward until a comfortable in-use position is found. To disengage, the armrest member 20 is rotated upward beyond the adjusting ranges of the armrest member. FIG. 5 depicts the mechanism 10 in the lowermost of the in-use positions, and FIG. 3 depicts the non-use position.

Figure 2:
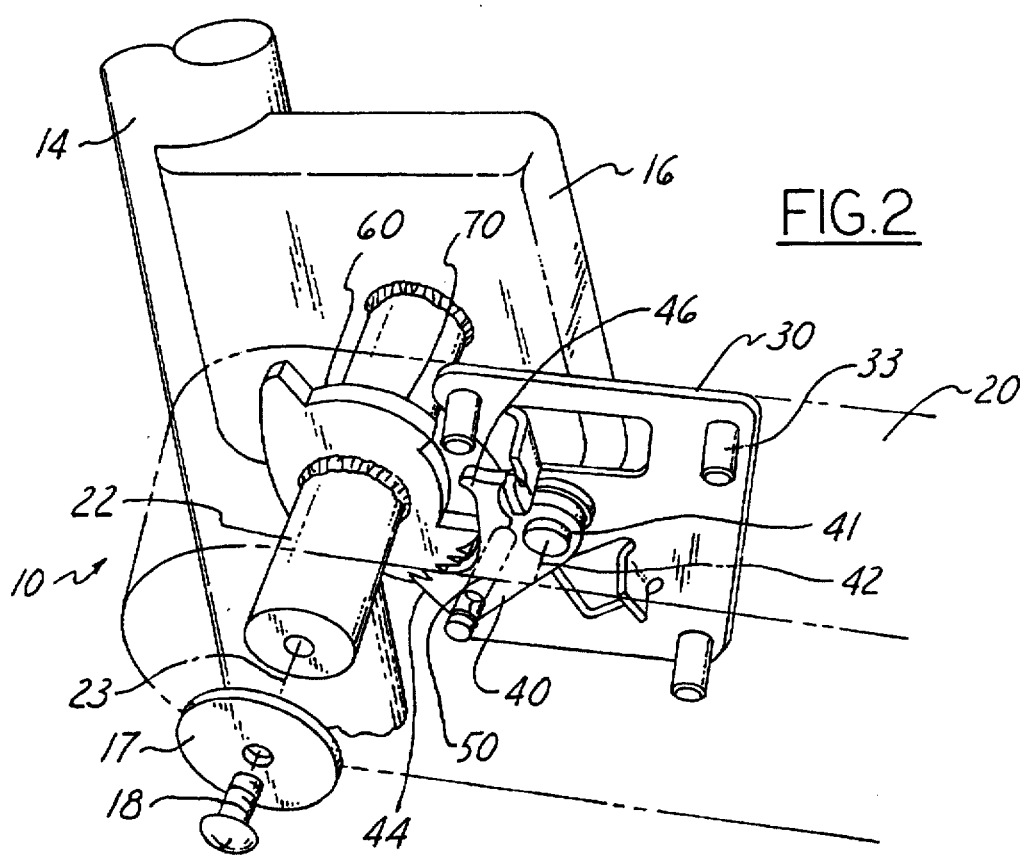
FIG. 2 is an enlarged perspective view of the adjustable armrest mechanism of FIG. 1 shown in the initial in-use position, with the armrest shown in phantom.
Figure 6:
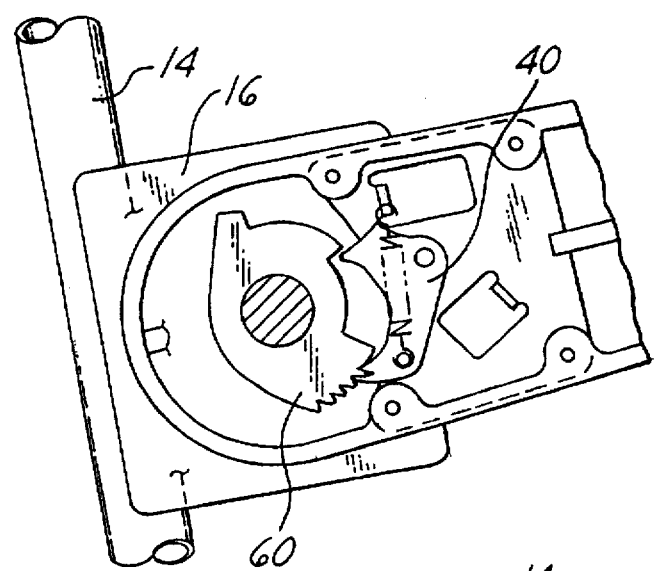
FIG. 6 is a partial sectional view of the adjustable armrest mechanism of FIG. 1 in the final in-use position.

The mounting bracket 16 as shown in FIG. 2 resembles a metal stand, and is secured to the vehicle seatback 14, and cooperatively engages the armrest member 20 through a metal bracket shaft 22 that is welded to the mounting bracket 16. Shaft 22 has a fist axis 23 extending therethrough. A washer 17 and setscrew 18 retain armrest member 20 which has a sleeve 24 (shown in FIGS. 3–5) fixed to armrest member 20 and pivotably disposed over bracket shaft 22. The armrest bracket 30 is substantially plate shaped. Four fasteners 33 securely attach the armrest bracket 30 to the armrest member 20. A first or armrest stop 34 extends outward from bracket 30. It should be appreciated that all or part of the armrest bracket 30 may be integrated into the armrest member 20.

The pawl 40 is pivotably attached to the armrest bracket 30 through pin 41 for rotation about an axis 42 of pin 41. The pawl 40 is generally C-shaped, and has a first pawl projection 44 disposed at a first end 45, and a second pawl projection 46 disposed at a second end 47 While the first pawl projection 44 is shown as having two engagement teeth for heavy-duty applications, it may be alternatively formed with one engagement tooth.

The tension spring member 50 as shown in FIG. 3, is preferably a tension spring having a first end 52 affixed to the pawl 40 and a second end 54 affixed to the armrest bracket 30.

The ratchet 60 is securely affixed to the bracket shaft 22 and the mounting bracket 16 by a weld or similar means. The ratchet 60 includes a camming surface 70 that is specifically designed for disengagement and re-engagement with the pawl 40.

The camming surface 70 of ratchet 60 includes a plurality of serrated teeth 74. Engagement between the engagement teeth of the first pawl projection 44 and the serrated teeth 74 define the plurality of in-use positions.

The camming surface 70 includes a ratchet stop 86 as shown in FIG. 3. During relative rotation into the non-use position, the pawl 40 contacts the ratchet stop 86, which then forces pawl 40 into contact with first stop 34 as shown in FIG. 3. As pawl 40 is pivoted from the in-use or first rotative position to the non-use or second rotative position, a spring axis 88 between the two ends of the coil spring 50 crosses the pin axis 42. As the spring axis 88 crosses the pin axis 42 in the direction of rotation toward the non-use position, the spring induced bias on the pawl 40 shifts from bias toward the in-use position to bias toward the non-use position. The pawl 40 is then securely retained between the first stop 34 and ratchet stop 86, which thereby prevents any further rotation of the pawl 40 relative to the ratchet 60 in the downward direction as the members are secured in the non-use position (see FIG. 3). This also prevents further rotation of armrest member 20. Note that the first pawl projection 44 is remote from the ratchet 60 in the non-use position.

A ratchet shoulder 82 of camming surface 70 engages the second pawl projection 46 as the armrest member 20 is rotated downwardly to the in-use position, causing the pawl 40 to be rotated toward the in-use position (see FIGS. 4 and 5).

The camming surface 70 also includes a disengagement projection 84 adjacent to the ratchet stop 86. Contact between the disengagement projection 84 and the second pawl projection 46 during upward rotation of armrest member 20 initiates pawl rotation into the non-use position (see FIG. 7). A first arcuate portion 83 extends from a top of disengagement projection 84 to a base of rachet stop 86.

A recessed second arcuate portion 78 of the camming surface 70 is disposed between disengagement projection 84 and ratchet shoulder 82. The recessed portion 78 is configured to provide clearance for the second pawl projection 47 when pawl 40 pivots into the in-use positions, when pawl 40 is in the in-use positions, and when pawl 40 pivots into the non-use position.

Figure 7:
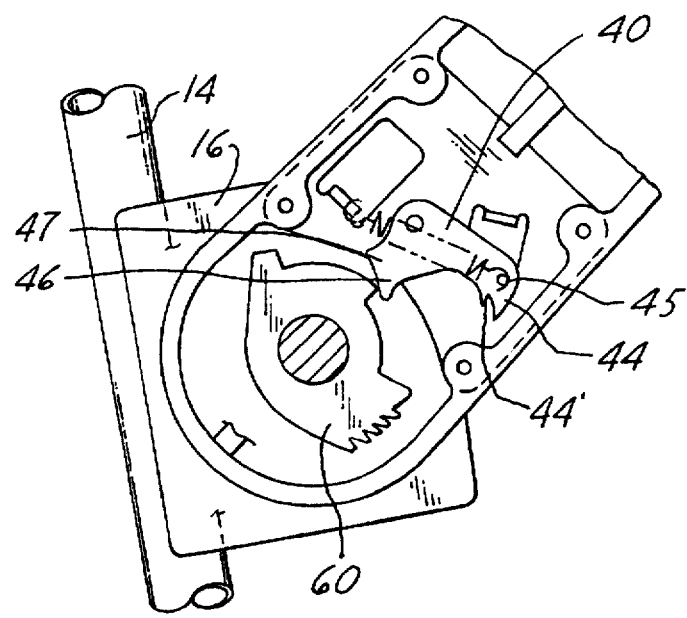
FIG. 7 is a partial sectional view of the adjustable armrest mechanism of FIG. 1, a ratchet shoulder engaging a pawl projection during relative rotation into the non-use position.

To initiate disengagement (see FIG. 6), the armrest member 20, including the armrest bracket 30 and pawl 40, is rotated in a counterclockwise direction as the first pawl projection 44 moves across the serrated teeth 74, until the disengagement projection 84 encounters the second pawl projection 46 rotating the pawl 40 in a counter clockwise direction to the non-use position (see FIG. 7). Rotation continues until the ratchet stop 86 engages the back of the second pawl projection 46 forcing the pawl 40 against the armrest stop 34 (see FIG. 3).

To initiate re-engagement (see FIG. 3), the armrest member 20 is rotated in a clockwise direction when the shoulder 82 is engaged by the second pawl projection 46 as shown in FIG. 4. The pawl 40 is rotated in a clockwise direction and is urged by the spring member 50 into engagement with the first of the serrated teeth 74 as the spring axis crosses the pin axis 42. The mechanism 10 is now in the first of the in-use positions. Further adjustment of the armrest 20 may be accomplished by slowly rotating the armrest 20 in the counter clockwise direction into any of the subsequent in-use positions with the first pawl projection 44 engaging the adjacent teeth of the ratchet 60.

A second preferred embodiment of the adjustable armrest mechanism 110 of the present invention is depicted in FIGS. 8 through 11. In this embodiment, the ratchet 60, and coil spring 50 are essentially the same as the first embodiment of FIGS. 1 through 6. The primary differences involve having armrest member 120 open to an outboard side instead of an inboard side, locating the armrest bracket 130 on an outboard side of armrest member 120, and supporting armrest member 120 on a shaft 122 adjacent to mounting bracket 116 instead of distal to mounting bracket 116.

Figure 10:
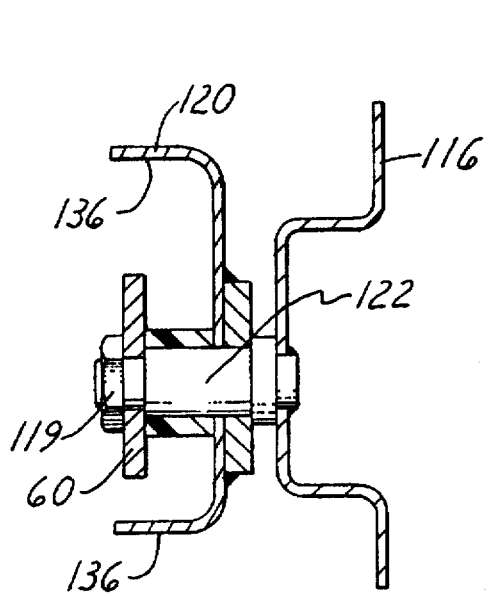
FIG. 10 is a sectional view 10—10 of the adjustable armrest mechanism of FIG. 9, showing the ratchet and the mounting bracket.

The mounting bracket 116 as seen in FIG. 10, includes a shaft secured thereto by a weld or other similar means. The shaft 122 is secured to the ratchet 60 by a fastener 119. Relative rotation between the ratchet 60 and the shaft 122 is prevented by providing a flat on one side of the shaft 122, and a D-shaped aperture 123 in the ratchet 60.

Figure 8:
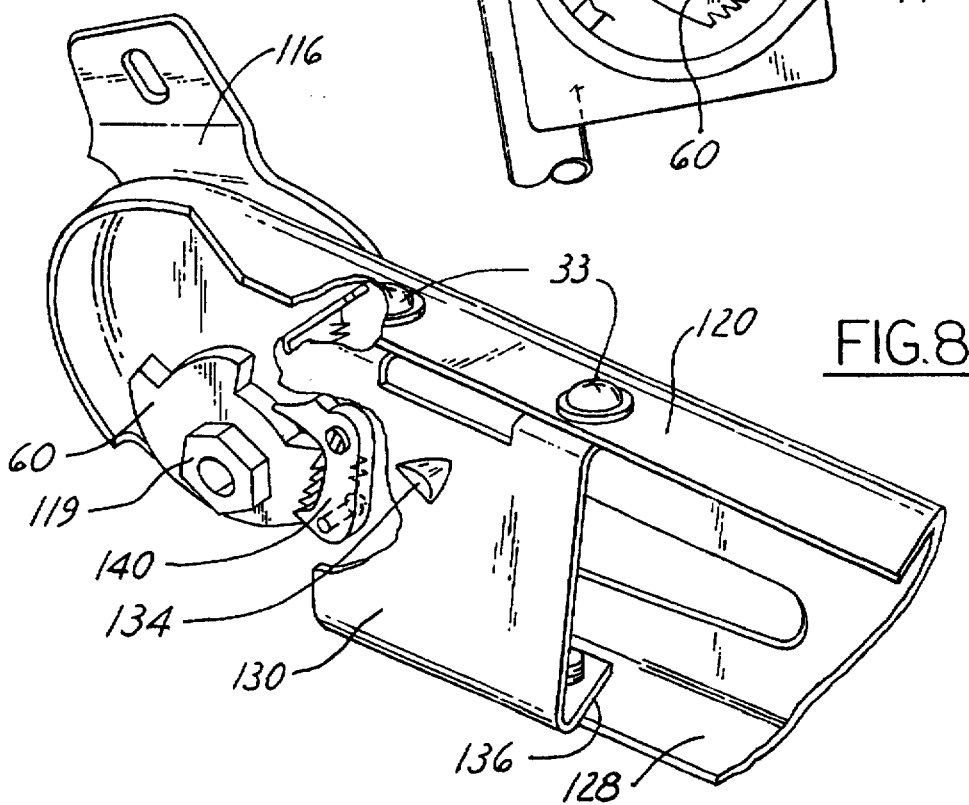
FIG. 8 is an enlarged perspective view of a second preferred embodiment of the adjustable armrest mechanism of the present invention shown in the in-use position, with the armrest shown in cutaway.
Figure 11:
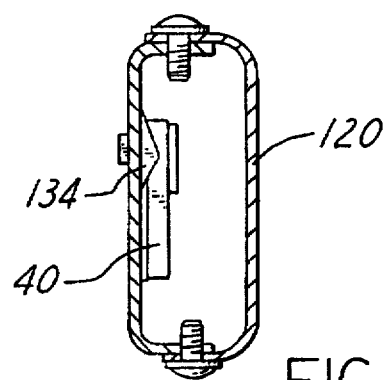
FIG. 11 is a sectional view 10—10 of the adjustable armrest mechanism of FIG. 9, showing the armrest mounting bracket and the pawl.
Figure 12:
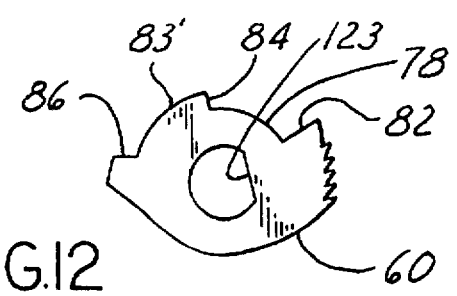
FIG. 12 is a side view of a ratchet of the arm rest mechanism.

The armrest member 120 as shown in FIG. 8, and shown in section in FIG. 11, is heavy gauge metal, is generally in the shape of a large hollow finger, and has arcuate side portions 128.

The armrest bracket 130 as shown in FIG. 8, and shown in section in FIG. 10, is essentially a flat plate 132 which includes four lip portions 136 that fit into the armrest member 120, and receive four fasteners 33. The armrest stop 134 is a triangular-shaped indent in the metal armrest bracket 130 extending toward the armrest member 120. One side of the triangle is abutted by the pawl 140 when in the non-use position.

Figure 9:
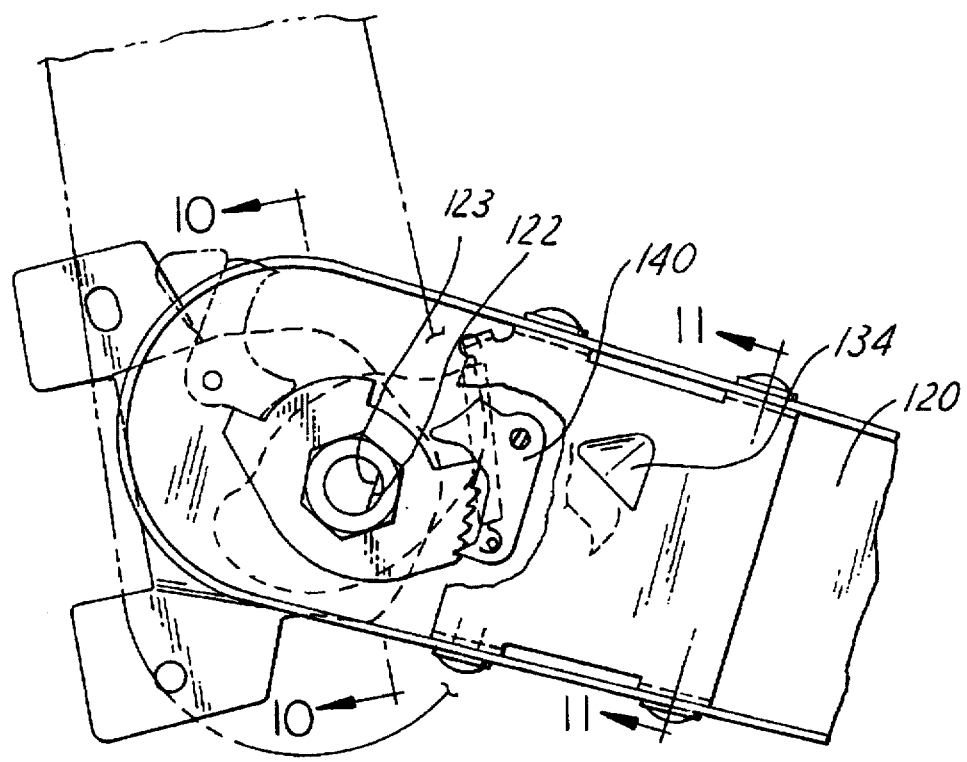
FIG. 9 is a partial sectional view of the adjustable arm rest mechanism of FIG. 8 in the initial in-use position, and the armrest mechanism in the non-use position shown in phantom.

FIG. 9 is a partial sectional view disclosing the adjustable armrest member 120 in the initial in-use position, with the armrest member 120 in the non-use position being shown in phantom.

It is evident that many alternatives, modifications, and variations of the adjustable armrest mechanism of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

I claim:

1. An adjustable armrest mechanism for use with a vehicle seatback, the adjustable armrest mechanism having a non-use position and a plurality of in-use positions, the mechanism comprising:

an armrest member being rotatably connected to a mounting feature for rotation about a first axis;

a pawl member being rotatably connected to the armrest member for rotation about a second axis between a first rotative position and a second rotative position, the pawl member having a first pawl projection at one end and a second pawl projection at a second end thereof;

a first stop fixed relative to the armrest member and engaged by the pawl member in the second rotative position;

a ratchet member being fixed to the mounting feature, the ratchet member having a camming surface for cooperative engagement with the pawl member;

the camming surface including:

a plurality of serrated teeth at a first end of the camming surface, engagement between the first pawl projection in the first position and the serrated teeth defining said plurality of in-use armrest member positions, a second stop at a second end of the camming surface engaged by the second pawl projection in the second rotative position when the armrest mechanism is in the second position, a first arcuate portion disposed between the first and second ends of the camming surface adjacent the second stop;

a second arcuate portion between the first arcuate portion and the serrated teeth having;

a recessed portion that is configured to provide clearance for the second pawl projection during rotation of the pawl from the second rotative position to the first rotative position and a shoulder at an end of the recessed portion adjacent to the serrated teeth which engage the second pawl projection and causes the pawl to rotate to the first rotative position during relative rotation from the non-use position into any of the in-use positions and a disengagement projection defining a step from the recessed portion to the first arcuate portion which engages the second pawl projection of the pawl member and causes the pawl to rotate to the second rotative position during relative rotation from any of the in-use positions into the non-use position; and a spring member disposed between the pawl member and the armrest member rotatively biasing the pawl member to the first rotative position when the pawl is in the first rotative position;

wherein simultaneous engagement of the pawl member with the first stop and the second stop prevent further rotation of the pawl member thereby preventing rotation of the armrest member beyond the non-use position.

\* \* \* \* \*

UNITED STATES PATENT AND TRADEMARK OFFICE
CERTIFICATE OF CORRECTION

PATENT NO. : 5,702,157
DATED : 12/30/97
INVENTOR(S) : Hurite

It is certified that error appears in the above-indentified patent and that said Letters Patent is hereby corrected as shown below:

Claim 1, column 6, line 7, delete ";" and insert --:--

Claim 1, column 6, line 13, delete "engage" and insert --engages--

Signed and Sealed this

Third Day of March, 1998

*Attest:*

BRUCE LEHMAN

*Attesting Officer*    Commissioner of Patents and Trademarks